(12) United States Patent
Inoue et al.

(10) Patent No.: US 8,459,133 B2
(45) Date of Patent: Jun. 11, 2013

(54) LINEAR ACTUATOR

(75) Inventors: Masaki Inoue, Kiryu (JP); Masato Nakamura, Kiryu (JP); Masatoshi Suzuki, Kiryu (JP); Tsuyoshi Kumamoto, Kiryu (JP)

(73) Assignee: Mitsuba Corporation, Gunma (JP)

( * ) Notice: Subject to any disclaimer, the term of this patent is extended or adjusted under 35 U.S.C. 154(b) by 235 days.

(21) Appl. No.: 12/915,474

(22) Filed: Oct. 29, 2010

(65) Prior Publication Data

US 2011/0100141 A1 May 5, 2011

(30) Foreign Application Priority Data

Oct. 30, 2009 (JP) .................................. 2009-249845

(51) Int. Cl.
*F16H 21/06* (2006.01)
(52) U.S. Cl.
USPC .......................................... 74/89.37; 74/567
(58) Field of Classification Search
USPC .................. 74/25, 89–89.45, 424.71–424.96, 74/567–569
See application file for complete search history.

(56) References Cited

U.S. PATENT DOCUMENTS

| 1,590,570 | A | * | 6/1926 | Flack et al. ................... 74/89.37 |
| 1,686,851 | A | * | 10/1928 | Gorman .......................... 318/266 |
| 1,710,367 | A | * | 4/1929 | Luczak ..................... 200/38 DA |
| 3,038,352 | A | * | 6/1962 | Murphy ............................. 475/2 |
| 3,192,349 | A | * | 6/1965 | Horberg, Jr. .................. 200/573 |
| 3,592,980 | A | * | 7/1971 | Alamprese .................... 200/81.4 |
| 3,682,283 | A | * | 8/1972 | Sato ................................. 192/141 |
| 3,764,875 | A | * | 10/1973 | Harris .......................... 318/266 |
| 3,795,785 | A | * | 3/1974 | Smith ......................... 219/124.4 |
| 3,996,697 | A | * | 12/1976 | Bailey et al. ...................... 49/28 |
| 4,010,408 | A | * | 3/1977 | Bailey ........................... 318/266 |
| 5,269,343 | A | * | 12/1993 | Trapp ............................ 137/554 |
| 5,299,678 | A | * | 4/1994 | Chang et al. .................. 192/141 |
| 5,890,585 | A | * | 4/1999 | Nakamura et al. .............. 200/47 |
| 6,321,611 | B1 | * | 11/2001 | Szu et al. ...................... 74/89.37 |
| 2007/0169578 | A1 | * | 7/2007 | Christensen et al. ......... 74/89.37 |
| 2009/0255354 | A1 | * | 10/2009 | Akkermann .................. 74/89.33 |
| 2009/0293655 | A1 | * | 12/2009 | Tseng et al. ................. 74/89.37 |
| 2010/0186529 | A1 | * | 7/2010 | Chiang et al. ............... 74/89.37 |

FOREIGN PATENT DOCUMENTS

| JP | 2004-218720 | 8/2004 |
| JP | 2008-95790 | 4/2008 |
| JP | 2008-95791 | 4/2008 |

* cited by examiner

*Primary Examiner* — David M Fenstermacher
*Assistant Examiner* — Valentin Craciun
(74) *Attorney, Agent, or Firm* — Wenderoth, Lind & Ponack, L.L.P.

(57) ABSTRACT

The swinging operation of a rotary striker turns micro switches and, which detect the position of a piston, ON/OFF. The striker includes a lower-limit switch cam and an upper-limit switch cam. The cams and engage with switch bosses and that move together with the piston. When the piston is positioned at a lower-limit stop position L, the cam becomes engaged with the boss to make the striker swing in the X-direction and pushes a switch button of the switch. When the piston is positioned at an upper-limit stop position U, the cam becomes engaged with the boss to make the striker swing in the Y-direction and pushes a switch button of the switch.

8 Claims, 5 Drawing Sheets

LINEAR ACTUATOR

BACKGROUND OF THE INVENTION

1. Field of the Invention

The present invention relates to, for example, an electric-powered linear actuator used in an operating unit of a medical/nursing-care bed, and particularly to the functioning structure of a micro switch for limiting the operating range of the actuator.

2. Related Art Statement

In the medical and nursing-care sectors, an electric-powered bed which moves a bed upward or downward, reclines, and carries out other operations by electric-powered actuators has been widely used to reduce burden on patients and caretakers. For the electric-powered bed actuators, a linear actuator of a feed-screw type is used in many cases. The feed-screw type linear actuator is equipped with a shaft having a male screw section and a female screw member (feed nut) that is threaded onto the shaft. As the shaft is rotated by an electric motor, the female screw member moves along the shaft.

The feed-screw type linear actuator is equipped with a worm wheel speed reduction device that reduces the speed of the rotation of the motor before conveying the rotation of the motor to the shaft. A movement cylinder is connected to the female screw member. The movement cylinder moves together with the female screw member. A link mechanism is connected to the movement cylinder through a connector: The link mechanism is designed to move a bed upward or downward as well as to tilt the back or knee portion of the bed. As the motor rotates, the shaft slows down and rotates. As the shaft rotates, the movement cylinder moves. When the movement cylinder moves forward or backward relative to a case of the actuator, the bed moves upward or downward or reclines by means of the link mechanism connected to the movement cylinder.

Meanwhile, a limit switch (micro switch) is used in the above kind of linear actuators to detect the end of strokes of the movement cylinder. For example, in the case of Patent Document 1, the end of strokes of the movement cylinder is detected by a limit switch. After the movement cylinder comes to the end of the strokes, the motor automatically stops operating.

What is also proposed is a linear actuator equipped with a striker that is used to operate a limit switch in order to secure the stop position accuracy of an actuator (Patent Document 2, for example). FIG. 5 is an explanatory diagram showing the configuration of a linear actuator equipped with a striker. A linear actuator 50 of FIG. 5 includes a drive-source motor 51, a motor unit 53 that houses a speed reduction mechanism unit 52, and a limit switch unit 55 where limit switches 54 are disposed. The limit switches 54a and 54b are disposed at the upper- and lower-limit positions of actuator strokes in the limit switch unit 55.

In the limit switch unit 55, a long and thin base plate 56 is so provided as to correspond to the strokes. On the base plate 56, the limit switches 54a and 54b are disposed for upper and lower limits. The limit switches 54a and 54b are put into units along with other circuit elements and are disposed around a piston (movement cylinder) 58 in a case 57. The piston 58 is mounted firmly on a screw nut 60 that is threaded onto a shaft 59. The shaft 59 is driven and rotated by the motor 51. As the shaft 59 rotates, the piston 58 moves together with the screw nut 60 in the axial direction. A striker 62 is attached to the screw nut 60 through a spring 61. The striker 62 comes in contact with the limit switches 54a and 54b at a movement limit position of the linear actuator 50. After the striker 62 pushes the buttons of the limit switches 54a and 54b, the motor 51 stops. The actuator, therefore, stops at a predetermined movement limit.

However, such a linear actuator requires various limit switch units because of differences in the specifications (length of strokes) of actuators. Accordingly, a base plate and other components need to be prepared as new components for each set of specifications. As a result, the problem is that the number of types of components increases, resulting in increases in production costs. Moreover, the base plate attached to the limit switch is narrow, long and thin and therefore is easy to deform. The deformation of the base plate could be a factor in decreasing the reliability of the actuator. Furthermore, it is difficult to carry out soldering work on the long and thin base plate. It is also difficult to make the long and thin base plate with a die, which is a factor in increasing costs. Moreover, a holder is required to keep the long base plate inside the case. Therefore, the number of components increases. Furthermore, since it is necessary to put the base plate, limit switches, strikers and other components in the case, the portion that houses the above components projects from the device. Therefore, another problem is that the device becomes large in size and is not excellent in terms of layout.

Meanwhile, in a device such as the one shown in FIG. 5, the operation of attaching the striker 62 to the screw nut 60 involves the operation of putting the spring 61 between both. The workability is not good and the structure of the device becomes complex. Furthermore, as the striker 62 moves in the axial direction, the striker 62 pushes the buttons of the limit switches 54a and 54b up, then, it is impossible to adopt an operation method recommended by switch manufacturers.

SUMMARY OF THE INVENTION

The object of the present invention is to provide a linear actuator that reduces the rise in costs and is excellent in terms of assembling, reliability and layout as well as being able to support an actuator having a different set of specifications in a flexible manner.

A linear actuator of the present invention includes: a shaft that is rotated by a driving force of a motor; a mobile object that linearly moves in response to the rotation of the shaft; a first switch that detects the state where the mobile object is positioned at one movement end; a second switch that detects the state where the mobile object is positioned at the other movement end; a projection portion that moves together with the mobile object; and a striker that becomes engaged with the projection portion and then makes the first or second switch operate as the mobile object moves toward a predetermined position. The striker may be equipped with: a first switch cam that becomes engaged with a first projection portion that moves together with the mobile object to make the striker swing when the mobile object is positioned at one movement end, and pushes the first switch; and a second switch cam that is connected to the first switch cam through a guide rod, becomes engaged with a second projection portion that moves together with the mobile object when the mobile object is positioned at the other movement end to make the striker swing in the opposite direction when the mobile object is positioned at one movement end, and makes the first switch cam push the second switch.

According to the present invention, the swinging operation of the striker turns ON/OFF the switches that detect the position of the mobile object. The striker includes the first and second switch cams that engage with the first and second projection portions moving together with the mobile object, which linearly moves in response to the rotation of the shaft.

When the mobile object is positioned at one movement end, the first switch cam becomes engaged with the first projection portion to make the striker swing and pushes the first switch. The second switch cam is connected to the first switch cam through a guide rod, becomes engaged with the second projection portion when the mobile object is positioned at the other movement end to make the striker swing in the opposite direction when the mobile object is positioned at one movement end, and makes the first switch cam push the second switch.

In the linear actuator, the first switch cam may be equipped with a push-up cam section that comes in contact with the first projection portion to make the striker swing and a relief cam section into which the second projection portion goes when the first projection portion comes in contact with the push-up cam section; and the second switch cam may be equipped with a push-up cam section that comes in contact with the second projection portion to make the striker swing and a relief cam section into which the first projection portion goes when the second projection portion comes in contact with the push-up cam section.

The following is also possible: The push-up cam section of the first switch cam is equipped with a push-up inclined plane with which the first projection portion comes in contact when the mobile object approaches one movement end and a holding plane on which the first projection portion runs when the mobile object reaches one movement end; the striker swings in one direction to make the first switch cam push the first switch as the first projection portion comes in contact with the push-up inclined plane of the first switch cam and runs onto the holding plane; the push-up cam section of the second switch cam is equipped with a push-up inclined plane with which the second projection portion comes in contact when the mobile object approaches the other movement end and a holding plane on which the second projection portion runs when the mobile object reaches the other movement end; and the striker swings in the other direction to make the first switch cam push the second switch as the second projection portion comes in contact with the push-up inclined plane of the second switch cam and runs onto the holding plane.

Furthermore, the relief cam section of the first switch cam may be equipped with a relief inclined plane onto which the second projection portion goes when the first projection portion comes in contact with the push-up inclined plane of the first switch cam and a slide plane onto which the second projection portion goes when the first projection portion runs onto the holding plane of the first switch cam; and the relief cam section of the second switch cam may be equipped with a relief inclined plane onto which the first projection portion goes when the second projection portion comes in contact with the push-up inclined plane of the second switch cam and a slide plane onto which the first projection portion goes when the second projection portion runs onto the holding plane of the second switch cam.

In addition, the guide rod may be equipped with: a first guide section into which the first projection portion goes and which is so formed as to allow the first projection portion to move between the first and second switch cams; and a second guide section into which the second projection portion goes and which is so formed as to allow the second projection portion to move between the first and second switch cams.

According to the linear actuator of the present invention, it is possible to accurately control the stop positions of the actuator even though the structure is simple. Since the structure of the device is simple, it is possible to make assembling work simple, and the causes of failure decrease. The reliability of the device also improves. If the striker is set according to the strokes of the actuator, it is easy to modify the specifications. Thus, it is not necessary to design and produce new components for each set of specifications, and it is possible to reduce production costs.

BRIEF DESCRIPTION OF THE DRAWINGS

FIG. 4 is an explanatory diagram showing an operating state of the micro switches when seen from the right-hand direction in FIG. 1.

DESCRIPTION OF THE PREFERRED EMBODIMENT

Figure 1:
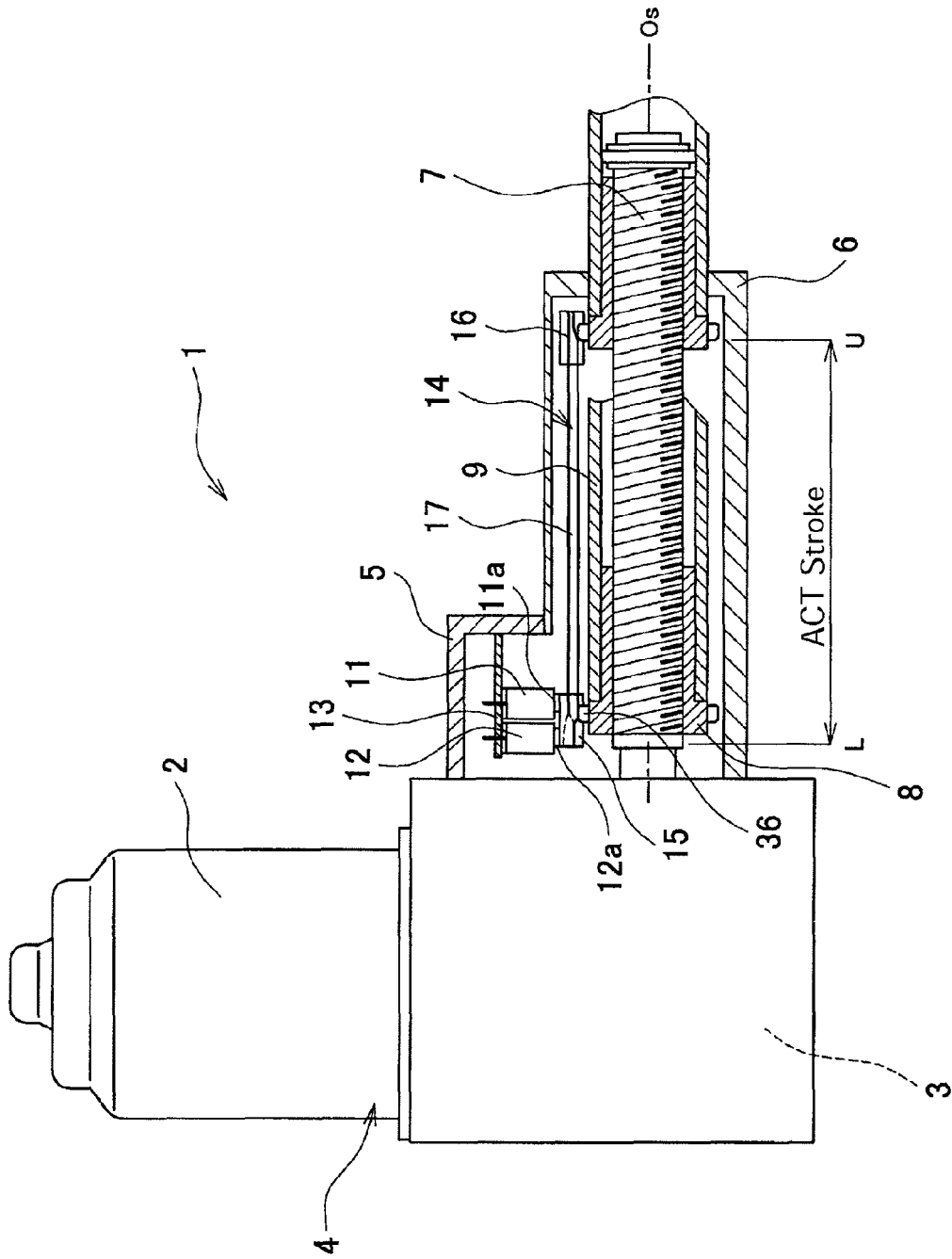
FIG. 1 is an explanatory diagram showing the configuration of a linear actuator according to an example of the present invention.

The following describes in detail an example of the present invention with reference to the accompanying drawings. FIG. 1 is an explanatory diagram showing the configuration of a linear actuator 1 according to an example of the present invention. The linear actuator 1 of the present example is for example used as a drive source to make a back-portion mat of a medical/nursing-care bed go up and down. The linear actuator 1 is equipped with a drive-source motor 2 and a motor unit 4 that houses a speed reduction mechanism unit 3. A main unit frame 5 is attached to the motor unit 4. A case 6 is attached to the frame 5. The case 6 houses a screw shaft 7, which is connected to the speed reduction mechanism unit 3, and a screw nut 8, which is threaded onto the shaft 7.

A piston (mobile object) 9 is attached to the screw nut 8. The piston 9 is designed to freely move in the axial direction (or the horizontal direction in FIG. 1) relative to the case 6. As the shaft 7 is driven and rotated by the motor 2, the piston 9 moves together with the screw nut 8 in the axial direction. The piston 9 moves forward or backward at the right-end side of the case 6.

In the linear actuator 1, the case 6 and the frame 5 at the fixed-end side are attached to a frame of the bed, which is not shown, so as to freely swing. Meanwhile, the tip of the piston 9 at the free-end side is connected to a link mechanism, which is not shown. The link mechanism is used to make the back-portion mat of the bed go up or down. When the piston 9 of the linear actuator 1 is in a contraction state, then the mat levels out horizontally. As the piston 9 becomes longer, the mat gradually rises.

Micro switches 11 and 12 are provided in the linear actuator 1 to limit the dropping/rising positions of the mat. The switches 11 and 12 detect and limit the advance/retreat positions of the piston 9 and the dropping/rising positions of the bed are limited. The micro switch 11 is a switch that makes the piston 9 stop at a movement limit position (which is a position where the mat levels out horizontally and will be referred to as lower-limit stop position L, hereinafter) shown in the left half of the diagram. The micro switch 12 is a switch that makes the piston 9 stop at a movement limit position (which is a position where the mat stands and will be referred to as upper-limit stop position U, hereinafter) shown in the right half of the diagram. The switches 11 and 12 are mounted on a printed board 13 that is disposed inside the frame 5. Switch buttons 11a and 12a of the switches 11 and 12 are disposed symmetrically about the central axis Os of the shaft 7. That is, the micro switches 11 and 12, each having the same set of specifications, are disposed in parallel in opposite directions.

Since the micro switches 11 and 12 are intensively mounted on the printed board 13 in the linear actuator 1, it is possible to install the printed board 13 inside the frame 5. Accordingly, it is possible to minimize the projection of the case 6 and make the actuator smaller in size as well as to improve the layout of the linear actuator. Since the micro switches 11 and 12 are intensively disposed, the printed board 13 can be put together into one type regardless of stroke variations. Accordingly, it is possible to decrease the number of types of components and reduce costs. Unlike a conventional linear actuator, it is not necessary to use a long and thin printed board, thereby preventing the board from easily bending and improving soldering workability. It is also possible to make the board with a die. Moreover, a holder member is not required to keep the printed board in the case, thus it is possible to make assembling work simple and reduce production costs.

Figure 2:
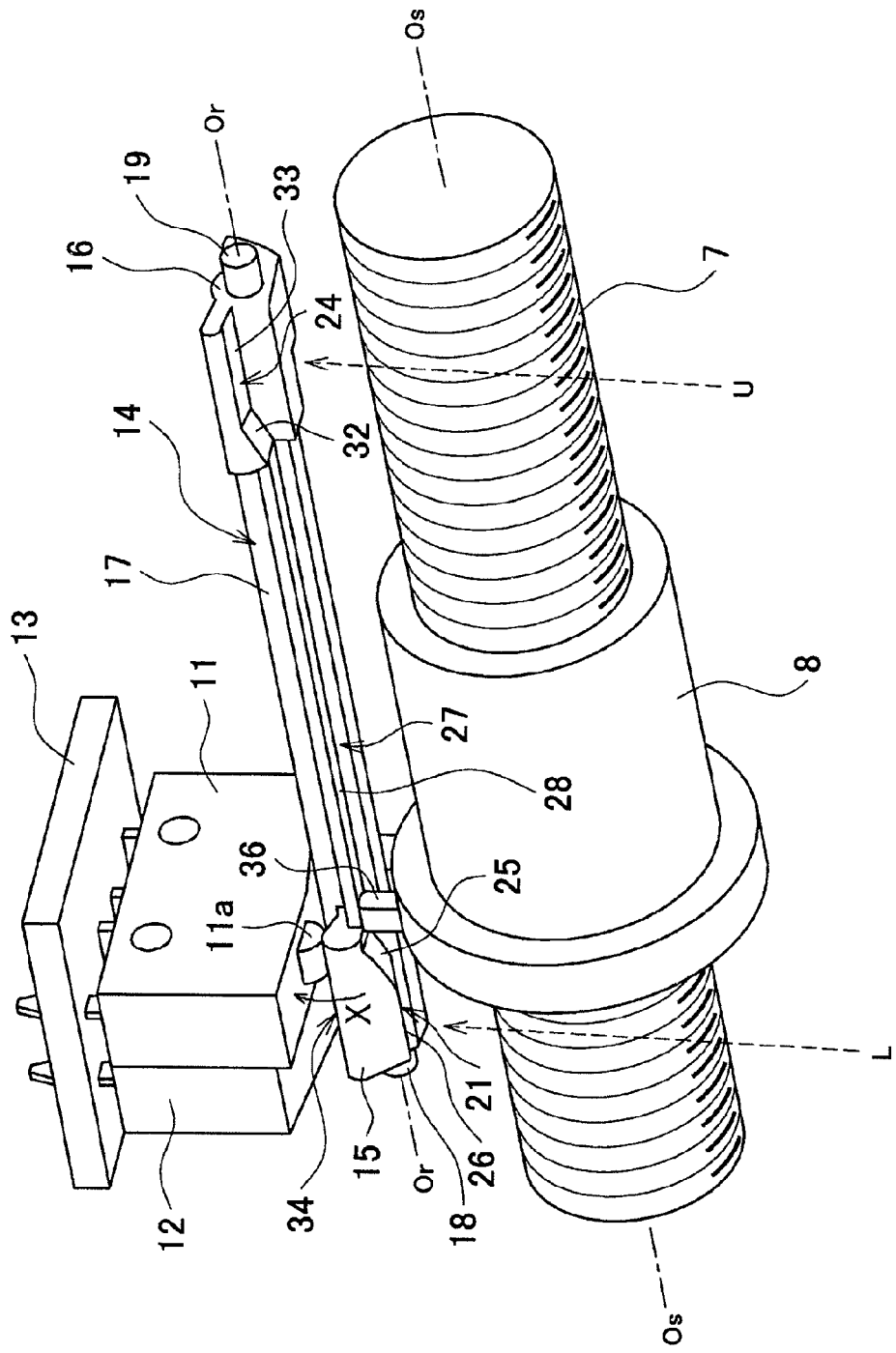
FIG. 2 is an explanatory diagram showing the configuration of micro switches and a rotary striker when the linear actuator is seen from the near side of the paper surface in FIG. 1.
Figure 3:
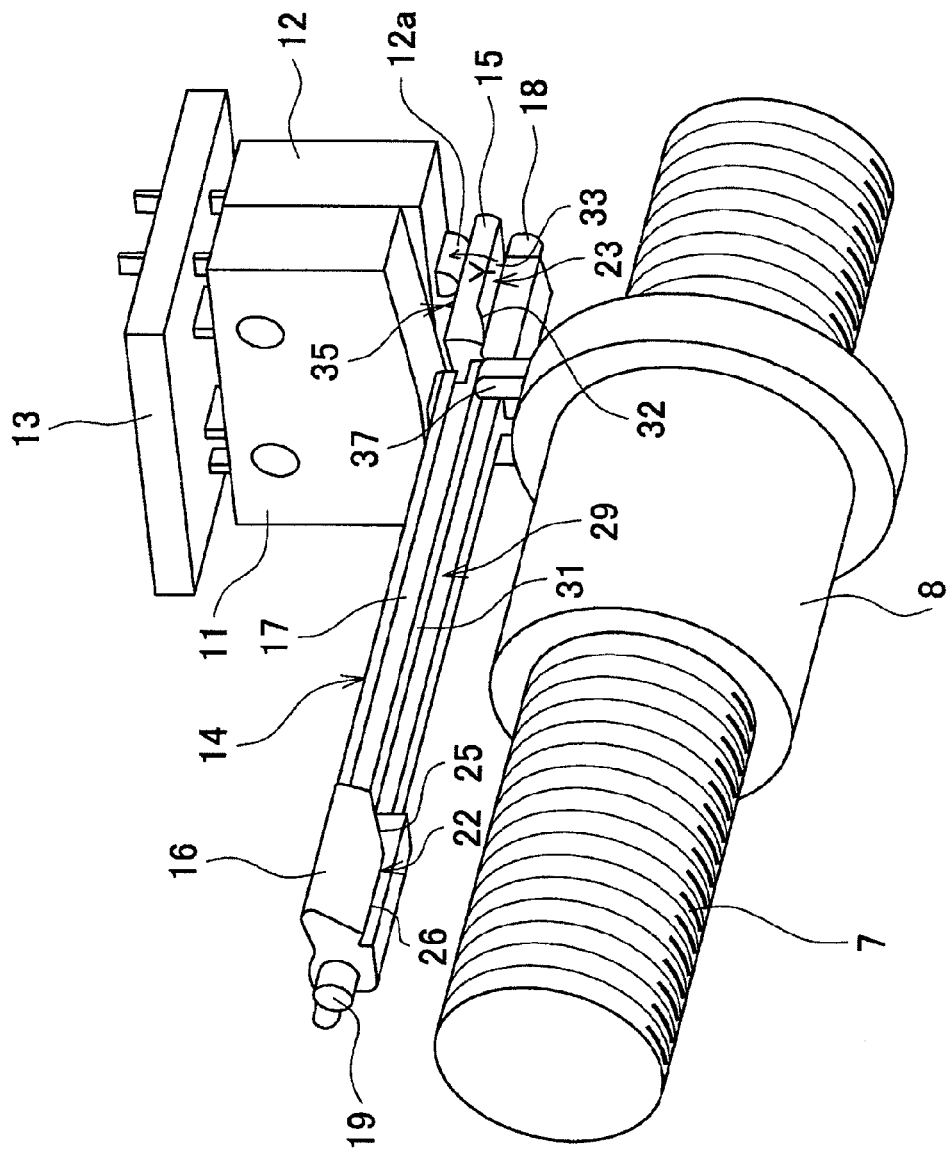
FIG. 3 is an explanatory diagram showing the configuration of the micro switches and the rotary striker when the linear actuator is seen from the back side of the paper surface in FIG. 1.
Figure 4A:
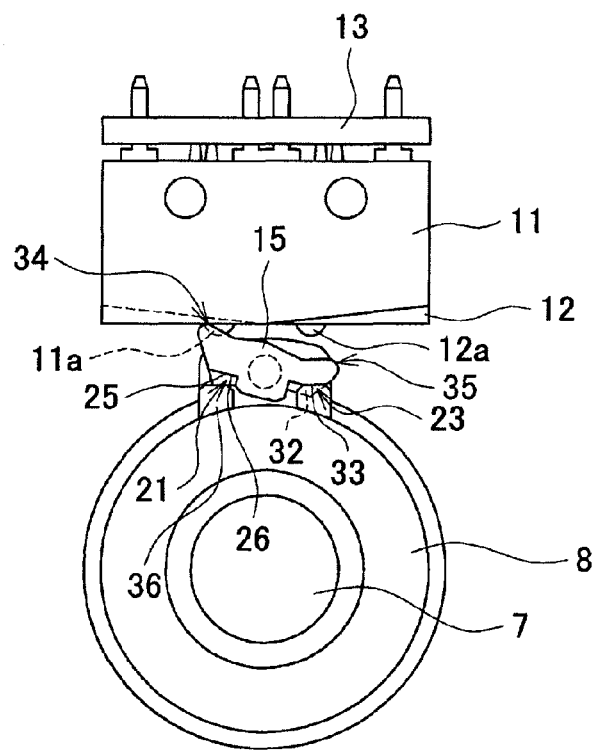
FIG. 4A shows a lower-limit stop position L and FIG. 4B shows the state of an upper-limit stop position U.
Figure 4B:
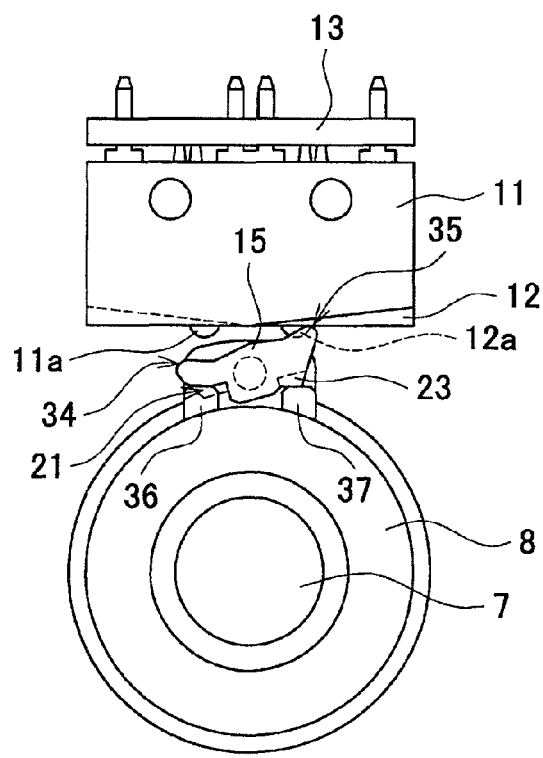
Figure 5:
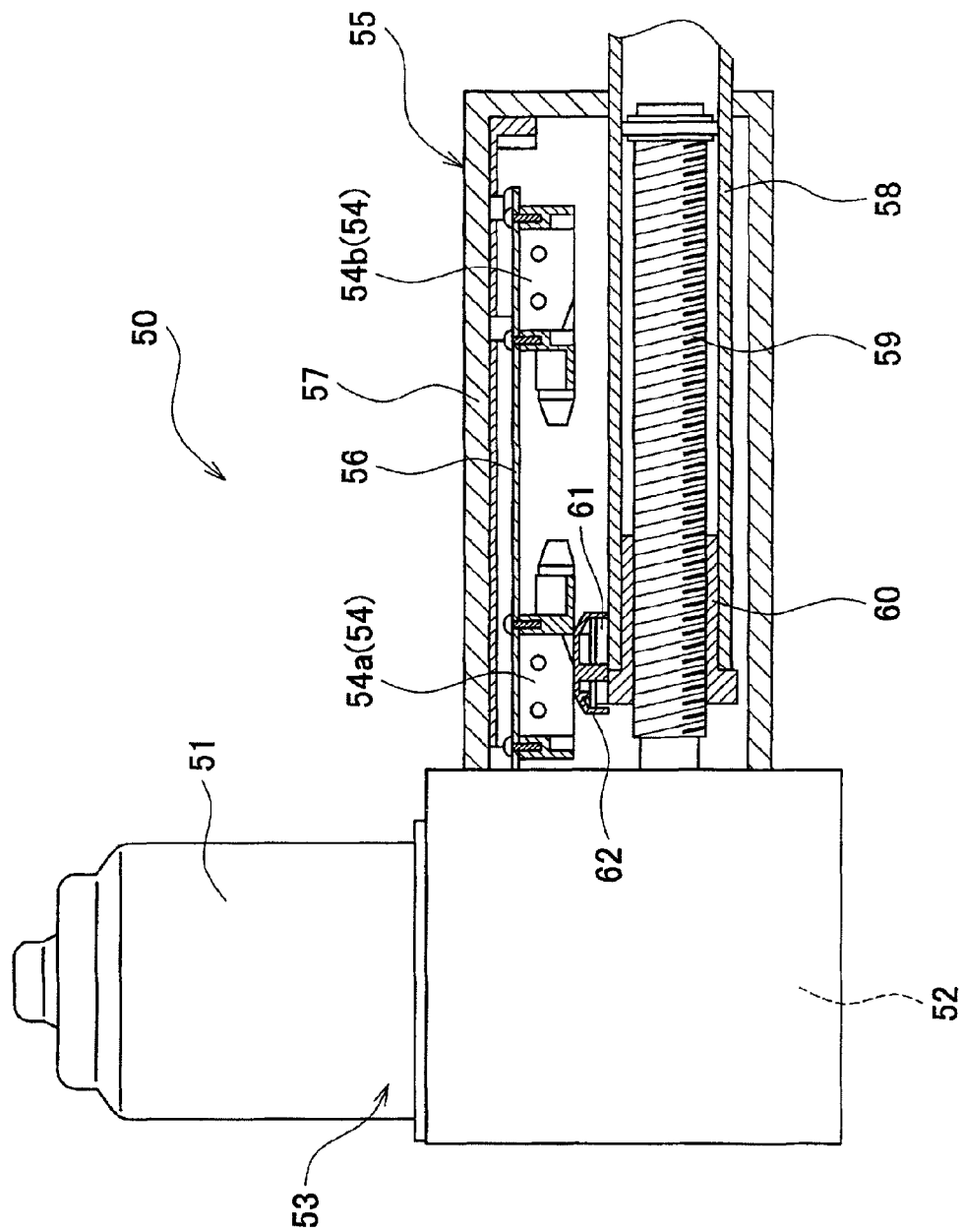
FIG. 5 is an explanatory diagram showing the configuration of a conventional linear actuator equipped with a striker.

In the linear actuator 1, the lower-limit stop micro switch 11 and the upper-limit stop micro switch 12 are turned ON/OFF by a rotary striker 14 that moves together with the screw nut 8. FIGS. 2 and 3 are explanatory diagrams showing the configuration of the switches 11 and 12 and the rotary striker 14. FIG. 2 shows the case where the linear actuator 1 is seen from the near side of the paper surface in FIG. 1. FIG. 3 shows the case where the linear actuator 1 is seen from the back side of the paper surface in FIG. 1. FIG. 4 is an explanatory diagram showing the switches 11 and 12 when seen from the right-hand direction in FIG. 1; FIG. 4A shows the state of a lower-limit stop position L and FIG. 4B shows the state of an upper-limit stop position U.

As shown in FIGS. 2 and 3, the rotary striker 14 is a rod-shaped member. The striker 14 is disposed above the shaft 7 along the axial direction (or the direction in which the shaft 7 extends). A lower-limit switch cam (first switch cam) 15 and an upper-limit switch cam (second switch cam) 16 are attached to respective ends of the striker 14. Between the switch cams 15 and 16, a rod-shaped guide rod 17 is formed, and the section of the guide rod 17 is in a convex shape (which projects downward in FIGS. 2 and 3). A supporting shaft 18 is provided on the end of the first switch cam 15 so as to project in the axial direction. A supporting shaft 19 is provided on the end of the second switch cam 16 so as to project in the axial direction. The supporting shaft 18 is supported inside the frame 5 so as to freely rotate. The supporting shaft 19 is supported inside the case 6 so as to freely rotate. The striker 14 is attached inside the frame 5 and the case 6 so as to freely swing (pivot) around the supporting shafts 18 and 19.

The switch cams 15 and 16 have push-up cam sections 21 and 22, respectively, as well as relief cam sections 23 and 24, respectively. That is, on the switch cam 15, the push-up cam section 21 and the relief cam section 23 are provided. On the switch cam 16, the push-up cam section 22 and the relief cam section 24 are provided. The push-up cam sections 21 and 22, as well as the relief cam sections 23 and 24, are so formed on the opposite sides of the rotational center Or of the striker 14 whose center is the supporting shafts 18 and 19 as to face each other.

The push-up cam sections 21 and 22 include push-up inclined planes 25 and holding planes 26. The push-up inclined planes 25 and the holding planes 26 are continuously formed so as to extend in the axial direction. On both sides of the guide rod 17, a guide section 27 (first guide section) and a guide section 29 (second guide section) are provided along the axial direction. The push-up inclined plane 25 of the switch cam 15 is seamlessly connected to a guide plane 28, which is an upper surface of the guide section 27, at the end of the guide section 27 around the lower-limit stop position L. The push-up inclined plane 25 of the switch cam 16 is seamlessly connected to a guide plane 31, which is an upper surface of the guide section 29, at the end of the guide section 29 around the upper-limit stop position U.

The relief cam sections 23 and 24 include relief inclined planes 32 and slide planes 33. The relief inclined planes 32 and the slide planes 33 are continuously formed so as to extend in the axial direction. The relief inclined plane 32 of the switch cam 15 is seamlessly connected to the guide plane 31 at the end of the guide section 29 around the lower-limit stop position L. The relief inclined plane 32 of the switch cam 16 is seamlessly connected to the guide plane 28 at the end of the guide section 27 around the upper-limit stop position U.

As shown in FIGS. 2 and 3, on the upper surface of the switch cam 15, switch contact sections 34 and 35 are provided. The switch contact section 34 is provided on the upper surface of the push-up cam section 21 so as to project. The switch contact section 34 is provided for the switch button 11a of the lower-limit stop micro switch 11. The switch contact section 35 is provided on the upper surface of the relief cam section 23 so as to project. The switch contact section 35 is provided for the switch button 12a of the upper-limit stop micro switch 12. The switch cams 15 and 16 swing on the supporting shafts 18 and 19. As the switch contact section 34 goes up, the switch button 11a is pushed and the switch button 12a is released. As the switch contact section 35 goes up, the switch button 12a is pushed and the switch button 11a is released.

Switch bosses 36 and 37 are provided on the screw nut 8 so as to protrude in the radial direction. The first switch boss 36 (first projection portion) is used to turn the lower-limit stop micro switch 11 ON/OFF. The second switch boss 37 (second projection portion) is used to turn the upper-limit stop micro switch 12 ON/OFF. The bosses 36 and 37 move together with the nut 8 in the axial direction as the shaft 7 is driven and rotated and the screw nut 8 moves in the axial direction. At this time, the boss 36 engages with the push-up cam section 21 of the cam 15, the guide section 27 of the guide rod 17 and the relief cam section 24 of the cam 16 and slides in the axial direction. The boss 37 engages with the relief cam section 23 of the cam 15, the guide section 29 of the guide rod 17 and the push-up cam section 22 of the cam 16 and slides in the axial direction.

In the linear actuator 1 that is equipped with the rotary striker 14 as described above, the lower-limit and upper-limit stop position control is carried out in the following manner. Under the circumstances of FIGS. 2 and 3, the switch bosses 36 and 37 engage with the guide sections 27 and 29 of the guide rod 17, and the striker 14 is in a neutral state. At this time, any of the switch buttons 11a and 12a is not pushed by the switch contact sections 34 and 35. Consequently, the switches 11 and 12 are each OFF.

In the linear actuator 1, when the screw nut 8 is midway between the lower and upper limits, the striker 14 always returns to the neutral state. It is not necessary to provide a return mechanism with the use of a spring or the like. The return mechanism is used to prevent the switch buttons from being pushed by the striker 14 when the screw nut 8 is positioned midway between the lower and upper limits. Accordingly, the structure of the device is simplified, costs are reduced and the reliability improves. When the screw nut 8 is positioned midway between the lower and upper limits, electricity is continuously fed to the motor 2. When a reclining switch of the bed is operated, the mat moves in any direction so as to level out or rise.

If the reclining switch is operated under the circumstances of FIGS. 2 and 3 in order to make the mat level out, the screw nut 8 moves toward the lower-limit stop position L (to the left in FIG. 2, or to the right in FIG. 3) as the motor 2 rotates. As the nut 8 moves toward the lower-limit stop position L, the switch boss 36 moves in the same direction. The boss 36 then becomes engaged with the push-up cam section 21 of the cam 15 from the guide section 27. As the nut 8 moves farther, the boss 36 slides over the push-up inclined plane 25. As the boss 36 slides over the push-up inclined plane 25, the striker 14 as a whole swings in the X-direction of FIG. 2.

As the boss 36 runs on the holding plane 26 in a way that makes the striker 14 (the cam 15) swing further in the X-direction, the switch contact section 34 pushes the switch button 11a up, thereby turning on the switch 11. Consequently, the supply of electricity to the motor 2 is cut off. As a result, the shaft 7 stops rotating, the piston 9 contracts and stops, and the mat levels out horizontally. Incidentally, as described above, when the striker 14 swings with the switch button 11a being pushed up by the switch contact section 34, the switch button 12a is being released and the switch 12 does not operate.

Meanwhile, during such a lower-limit stop operation, the other boss 37 gets into the relief cam section 23 from the guide section 29 after the boss 36 comes in contact with the push-up cam section 21. That is, as the boss 36 slides over the push-up inclined plane 25, the boss 37 moves on the portion of the relief inclined plane 32. As the boss 36 runs onto the holding plane 26, the boss 37 gets onto the slide plane 33 and the cam 15 can freely swing in the X-direction. The swing angle is limited by the boss 37. Thus, the cam 15 does not swing more than required and push the switch 11, and it is possible to carry out a smooth switching operation with high reliability.

If the reclining switch is operated under the circumstances of FIGS. 2 and 3 in order to make the mat rise, the screw nut 8 moves toward the upper-limit stop position U (to the right in FIG. 2, or to the left in FIG. 3) as the motor 2 rotates. As the nut 8 moves toward the upper-limit stop position U, the switch boss 37, contrary to the above case, moves to the right. The boss 37 then becomes engaged with the push-up cam section 22 of the cam 16 from the guide section 29 (see FIG. 3). As the nut 8 moves farther, the boss 37 slides over the push-up inclined plane 25. As the boss 37 slides over the push-up inclined plane 25, the striker 14 as a whole, contrary to the above case, swings in the Y-direction of FIG. 3.

As the boss 37 runs on the holding plane 26 in a way that makes the striker 14 (the cam 15) swing further in the Y-direction, the switch contact section 35 pushes the switch button 12a up, thereby turning on the switch 12. Consequently, the supply of electricity to the motor 2 is cut off. As a result, the shaft 7 stops rotating, the piston 9 becomes longer and stops, and the mat rises. Incidentally, even in this case, the switch button 11a is being released and the switch 11 does not operate.

During the upper-limit stop operation, the other boss 36 gets into the relief cam section 24 from the guide section 27 after the boss 37 comes in contact with the push-up cam section 22. That is, as the boss 37 slides over the push-up inclined plane 25, the boss 36 moves on the portion of the relief inclined plane 32. As the boss 37 runs onto the holding plane 26, the boss 36 gets onto the slide plane 33 and the cam 15 can freely swing in the Y-direction. The swing angle is limited by the boss 37. Thus, the cam 15 does not swing more than required and push the switch 12 up, and it is possible to carry out a smooth switching operation with high reliability.

As described above, in the linear actuator 1 of the present invention, the swinging (pivoting) operation of the rotary striker 14 turns the micro switches 11 and 12 ON/OFF. Even though the structure is simple, it is possible to accurately control the stop positions of the actuator. In particular, since the striker 14 and the switches 11 and 12 are disposed around the frame 5, it is possible to secure stable stop position accuracy even if dimensional tolerances are accumulated, and the stop position accuracy improves. Since the structure of the device is simple, it is possible to make assembling work simple, and the causes of failure decrease. The reliability of the linear actuator also improves. If the striker is set according to the strokes of the actuator, it is easy to modify the specifications, it is not necessary to design and produce new components for each set of specifications, and it is possible to reduce production costs.

In the striker 14, the switch buttons 11a and 12a of the switches 11 and 12 are pushed up in the vertical direction from below by the switch contact sections 34 and 35. Therefore, it is possible to adopt an operation method recommended by switch manufacturers, and the reliability and durability of the device improve. Moreover, it is not necessary to put a spring or the like into the striker. Thus, it is possible to make assembling work simple, the causes of failure decrease, and the reliability of the linear actuator improves.

Needless to say, the present invention is not limited to the above example. The present invention may be modified in various ways without departing from the scope thereof.

According to the above example, the linear actuator of the present invention is used in an operating unit of a medical/nursing-care bed. However, the target to which the linear actuator of the present invention is applied is not limited to a bed. The linear actuator of the present invention can be applied to various machines and devices, such as automobiles and home electric appliances, that have functioning parts.

What is claimed is:

1. A linear actuator comprising:
   a shaft to be rotated by a driving force of a motor;
   a mobile object configured to be moved in a linear direction by rotation of said shaft;
   a first switch for detecting a state in which said mobile object is positioned at a first movement end;
   a second switch for detecting a state in which said mobile object is positioned at a second movement end opposite said first movement end, said second switch being separate from said first switch;
   a projection portion configured to move together with said mobile object; and
   a pivotable striker configured to engage said projection portion and to operate one of said first switch and said second switch as said mobile object moves toward a predetermined position, said striker being configured to pivot about an axis extending substantially parallel to said shaft.

2. The linear actuator of claim 1, wherein said striker includes a switch cam configured to engage said projection portion when said mobile object is positioned at a first one of said first movement end and said second movement end so as to pivot said striker, wherein said striker, said first switch, and said second switch are configured such that a pivoting motion of said striker causes said switch cam to push a first one of said first switch and said second switch.

3. The linear actuator of claim 2, wherein said switch cam comprises a first switch cam, said striker further including a second switch cam connected to said first switch cam by a guide rod, said projection portion comprising a first projection portion, said linear actuator further comprising a second projection portion configured to move together with said mobile object; and
   wherein said second switch cam is configured to engage said second projection portion when said mobile object is positioned at a second one of said first movement end and said second movement end so as to pivot said striker in a direction opposite to a pivoting direction occurring when said mobile object is positioned at said first one of said first movement end and said second movement end, wherein said striker, said first switch, and said second switch are configured such that a pivoting motion of said striker in the direction opposite to the pivoting direction occurring when said mobile object is positioned at said first one of said first movement end and said second movement end causes said second switch cam to push a second one of said first switch and said second switch.

4. The linear actuator of claim 3, wherein said first switch cam includes a first push-up cam section for contacting said first projection portion to cause said striker to pivot, and a first relief cam section into which said second projection portion enters when said first projection portion is in contact with said first push-up cam section; and
   wherein said second switch cam includes a second push-up cam section for contacting said second projection portion to cause said striker to pivot, and a second relief cam section into which said first projection portion enters when said second projection portion is in contact with said second push-up cam section.

5. The linear actuator of claim 4, wherein:
   said first push-up cam section of said first switch cam includes a first push-up inclined plane which contacts said first projection portion when said mobile object approaches said first one of said first movement end and said second movement end, and a first holding plane which contacts said first projection portion when said mobile object reaches said first one of said first movement end and said second movement end;
   said striker being configured to pivot in a first direction to cause said first switch cam to push said first switch as said first projection portion contacts said first push-up inclined plane of said first switch cam and travel onto said first holding plane;
   said second push-up cam section of said second switch cam includes a second push-up inclined plane which contacts said second projection portion when said mobile object approaches said second one of said first movement end and said second movement end, and a second holding plane which contacts said second projection portion when said mobile object reaches said second one of said first movement end and said second movement end;
   said striker being configured to pivot in a second direction to cause said second switch cam to push said second switch as said second projection portion contacts said second push-up inclined plane of said second switch cam and travel onto said second holding plane.

6. The linear actuator of claim 5, wherein:
   said first relief cam section of said first switch cam includes a first relief inclined plane onto which said second projection portion travels when said first projection portion is in contact with said first push-up inclined plane of said first switch cam, and a first slide plane onto which said second projection portion travels when said first projection portion travels onto said first holding plane of said first switch cam; and
   said second relief cam section of said second switch cam includes a second relief inclined plane onto which said first projection portion travels when said second projection portion is in contact with said second push-up inclined plane of said second switch cam, and a second slide plane onto which said first projection portion travels when said second projection portion travels onto said second holding plane of said second switch cam.

7. The linear actuator of claim 3, wherein said guide rod includes:
   a first guide section into which said first projection portion travels, said first guide section being configured to allow said first projection portion to move between said first switch cam and said second switch cam; and
   a second guide section into which said second projection portion travels, said second guide section being configured to allow said second projection portion to move between said first switch cam and said second switch cam.

8. The linear actuator of claim 1, wherein said axis of said striker is non-coaxial with said shaft.

* * * * *